United States Patent [19]

Janu

[11] 3,791,397
[45] Feb. 12, 1974

[54] DIAPHRAGM PRESSURE SENSOR
[75] Inventor: George J. Janu, Milwaukee, Wis.
[73] Assignee: Johnson Service Company, Milwaukee, Wis.
[22] Filed: Aug. 30, 1972
[21] Appl. No.: 284,725

[52] U.S. Cl. .................................................. 137/82
[51] Int. Cl. .......................... F15b 5/00, G05d 16/00
[58] Field of Search ........ 137/82, 85; 251/61.1, 265

[56] References Cited
UNITED STATES PATENTS

| | | | |
|---|---|---|---|
| 3,698,414 | 10/1972 | Nagata | 137/85 |
| 2,966,170 | 12/1960 | Raulins | 251/265 X |
| 3,662,779 | 5/1972 | Weber | 137/82 UX |
| 3,563,458 | 2/1971 | Martin | 137/82 |

Primary Examiner—Alan Cohan
Attorney, Agent, or Firm—Andrus, Sceales, Starke & Sawall

[57] ABSTRACT

A pressure sensor includes a diaphragm mounted in relatively fixed relationship with respect to an orifice unit interconnected to the end of a threaded pipe. A threaded adjustment nut is provided with an internal thread to receive the pipe member and includes an outer threaded portion which is threaded into a housing. The inner and outer threads of the adjustment nut are of a very slightly different pitch. The threaded pipe is mounted to prevent rotation of the threaded support member while permitting axial movement thereof. Rotation of the adjustment nut results in axial displacement of the threaded pipe and orifice unit with respect to the diaphragm.

12 Claims, 5 Drawing Figures

PATENTED FEB 12 1974 3,791,397
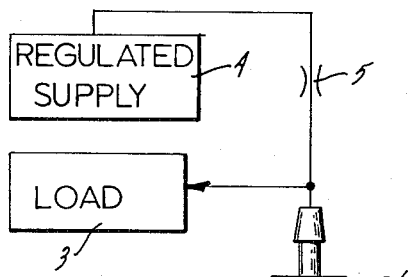
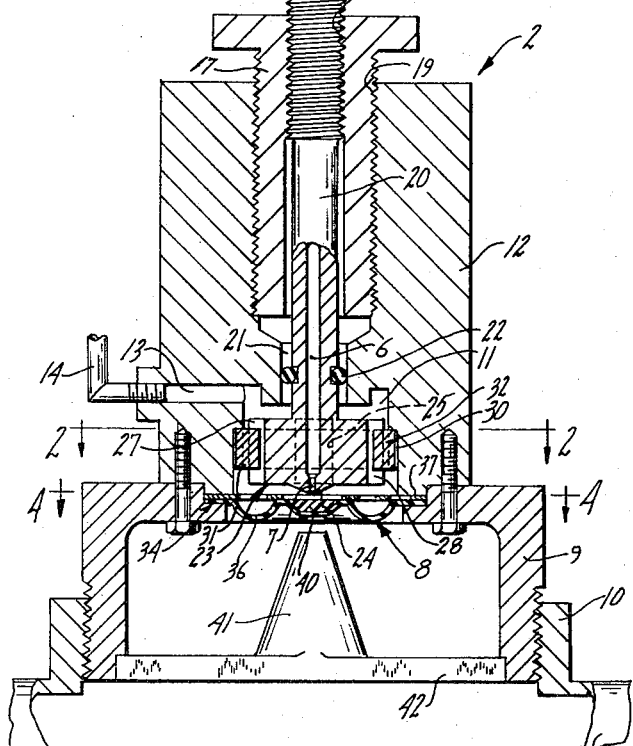
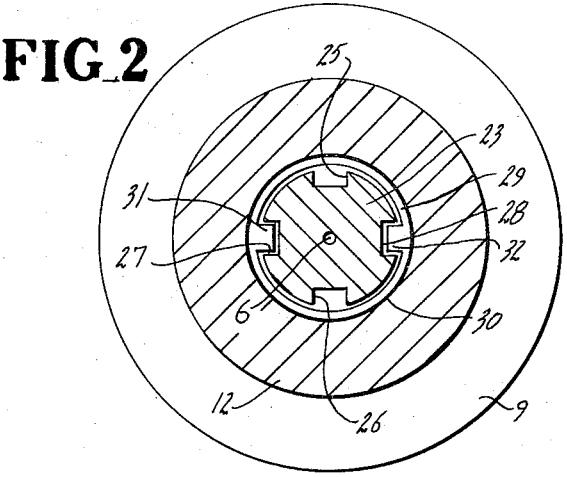
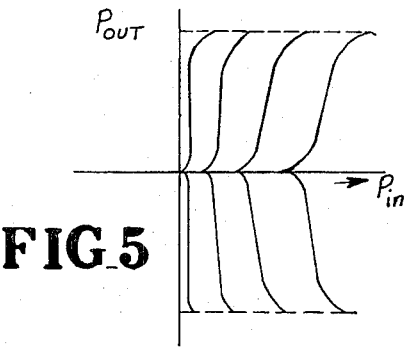
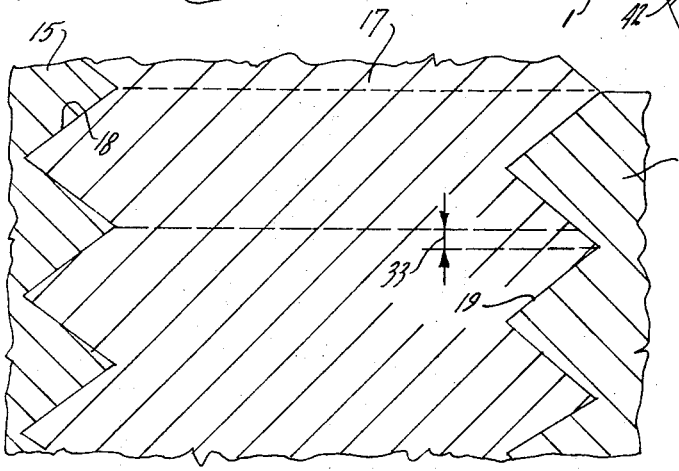
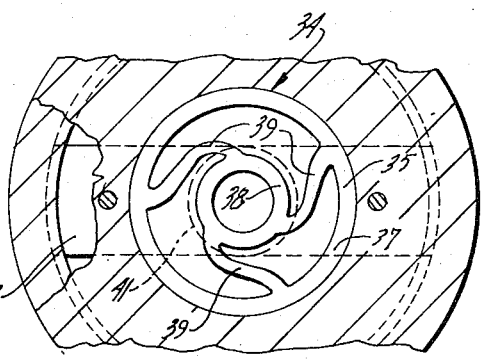
FIG.1
FIG.2
FIG.5
FIG.4
FIG.3

3,791,397

DIAPHRAGM PRESSURE SENSOR

BACKGROUND OF THE INVENTION

This invention relates to a diaphragm pressure sensor having an adjustable set point control.

In fluid control systems, sensors are often employed to sense pressure conditions within the system and connected to establish an interrelated control. A highly satisfactory pressure sensor includes an orifice means connected to a restricted supply in combination with a diaphragm or lid means for adjustably varying the relative opening of the orifice. The spacing of the orifice from the diaphragm determines the flow and therefore the back pressure generated within the orifice and interconnecting supply or fluid line. Generally the unit will include the diaphragm as a common wall between a reference or input chamber and the orifice chamber which is also connected to an exhaust or reference pressure. The input chamber may include a calibrated spring in combination with a relatively fine threaded adjustment screw for preloading of the spring and thereby variably positioning of the diaphragm with respect to the orifice. For any given design, spacers may also be introduced between the diaphragm and the support means to adjust the initial spacing therebetween and thereby the set point adjustment.

The output of the present pressure sensor can provide an essentially on-off type output signal by employing diaphragm-leakport amplification with a sufficiently high gain.

The pressure sensor may advantageously incorporate the combination of a convoluted diaphragm and a flat web spring construction in accordance with the teaching of U. S. Pat. No. 3,662,779 which issued to Weber et al. on May 16, 1972. As disclosed therein, the convoluted diaphragm establishes an essentially zero spring rate while the web spring can be constructed to produce an essentially constant spring rate to establish an increasing force with displacement in a linear manner.

Although such pressure sensors provide a satisfactory response, the set point adjustments require relatively close tolerance adjust means particularly if an extremely fine set point adjustment is desired. Further, the prior art sensors have not generally been capable of sensing extremely low pressures of the order of a fraction of an inch of water gauge nor does the set point adjustment encompass a large span.

SUMMARY OF THE PRESENT INVENTION

The present invention is particularly directed to a diaphragm type pressure sensor including an improved set point adjustment means which permits the sensing of extremely low pressures while maintaining accurate setting of the set point pressure over a relatively large span or range. Generally, in accordance with the present invention the diaphragm unit is mounted in relatively fixed relationship with respect to the housing and the orifice unit is movably mounted with respect to the housing to adjust the set point. In accordance with a particularly novel aspect of this invention, the orifice means is interconnected into a threaded support member. A threaded adjustment member is provided with an internal thread to receive the support member and includes an outer threaded portion which is threaded into a suitable support housing. The inner and outer threads of the adjustment member are of a very slightly different pitch. Further, the threaded support member is mounted to prevent rotation of the threaded support member while permitting axial movement thereof. Consequently, rotation of the adjustment member results in a very slight axial displacement of the threaded support member. This permits accurate setting of the orifice with respect to the diaphragm member.

The diaphragm unit is mounted, preferably with the separate flat spring, with a minimum spring rate at the unstressed mid-position of the assembly and, consequently, its sensitivity is very high at the lowest set point adjustment. Applicant has found that accurate sensing of relatively low pressures on the order of a fraction of an inch of water gauge can be obtained with this construction.

The differential threaded arrangement provides for very accurate adjustment of the orifice with relatively inexpensive an readily mass produced components.

In addition the diaphragm and spring assembly can be readily protected against both positive and negative pressure overloads by providing suitable backing means to the opposite side of the diaphragm surfaces.

BRIEF DESCRIPTION OF THE DRAWINGS

The drawing furnished herewith illustrates a preferred construction of the present invention and in which the above advantages and features are clearly disclosed as well as others which will be readily understood from the subsequent description of such embodiment.

In the drawing:

FIG. 1 is a vertical section through a pressure sensor constructed in accordance with the present invention;

FIG. 2 is a horizontal section taken generally on line 2—2 of FIG. 1 illustrating an orifice plate interlock construction;

FIG. 3 is an enlarged fragmentary view more clearly illustrating the threaded construction shown in FIG. 1;

FIG. 4 is a horizontal section taken on line 4—4 of FIG. 1 and illustrating the diaphragm construction; and FIG. 5 is a graphical illustration of the sensor operation.

DESCRIPTION OF ILLUSTRATED EMBODIMENT

Referring to the drawing and particularly to FIG. 1 a flow line 1 is illustrated with a pressure sensor 2 constructed in accordance with the present invention connected in line 1. the pressure sensor 2 is shown connected to actuate a load 3 which may, for example, be a timing portion of a controller such as disclosed in Applicant's co-pending application entitled "TWO-POSITION LIQUID LEVEL CONTROLLER," which was filed on the same day as this application and is assigned to a common assignee with this application. The pressure sensor 2 is a leakport type unit connected to a regulated fluid supply 4 via a pressure dropping restrictor 5. The load 3 is connected between the restrictor 5 and the pressure sensor 2. The restrictor 5 and the pressure sensor 2 define a pressure dividing network with the pressure signals applied to the load 3 being directly controlled by the flow through the pressure sensor 2 and the resulting pressure drop on the orifice 5.

The pressure sensor 2 includes a passageway 6 terminating in an orifice 7. A diaphragm unit 8 forms a part of an input chamber 9 and is mounted in overlying spaced relationship to the orifice 7. The member 9 forms one part of a two piece housing and is threaded into a mounting stub 10 on the flow line 1 to interconnect the sensor 2 to the flow line. Thus, the pressure in the flow line 1 is developed to the underside of the diaphragm unit 8, in the illustrated embodiment of the invention, and correspondingly positions the diaphragm unit to adjust the exhaust flow from the orifice 7.

The orifice 7 terminates within a discharge chamber 11 formed within the opposite housing member 12 and is connected via a discharge passageway 13 to a suitable reference pressure as by a connecting conduit 14. The passageway may, of course, be directly exited to atmosphere for pneumatic systems and the like. If the apparatus is to be operated submerged in liquid or the like the conduit 14 can, of course, provide for exiting to an appropriate atmosphere or other enviornment.

More particularly in the illustrated embodiment of the invention, the passageway 6 is formed in and as a part of a threaded screw 15 which defines a threaded support member for the orifice 7. The upper end of the screw 15 is provided with a suitable connector 16 for connection to the load 3 and the restrictor 5.

The member 15 is threaded into an adjustment nut 17 by corresponding threads as at 18. The adjustment nut 17, in turn, is threaded into an appropriately tapped opening in the housing 12 as at 19.

The threaded screw 15 includes an inner smooth shaft 20 which extends downwardly through an unthreaded portion of nut 17 and a reduced throat section 21 in the housing 12 immediately above the chamber 11. An O-ring seal 22 seals the throat 21 about the shaft portion 20. The inner end of the screw 15 is enlarged to define an orifice plate 23 which is generally a disc-shaped member with the orifice 7 formed as a nozzle projection from the lower wall thereof which terminates in lower flat face 24. Referring particularly to FIGS. 1 and 2, the peripheral edge of the plate 23 is provided with a plurality of axial notches shown as a first pair of diametrically located notches 25 and 26 and a second set of diametrically located notches 27 and 28 displaced 90° with respect to the first pair. A locking ring 29 is secured as by a suitable interconnecting adhesive or attachment means 30 to the side wall of the chamber 11. It includes a pair of diametrically inwardly radial projections 31 and 32 aligned and mating with the diametrical slots 27 and 28 in the plate 23. The slots 27 and 28 and mating projections 31 and 32 prevent rotation of the screw 15. The notches extend throughout the depth of the plate 23, however, and thus permit axial movement of the orifice plate 23 and interconnected screw 15.

In accordance with a particularly novel aspect of the present invention, the threads 17 and threads 18 are of a slightly different pitch, as shown in the enlarged view of FIG. 3 at 33. Consequently, rotation of the threaded nut 17 in combination with the prevention of the rotation of the screw 15 establishes a differential screw action causing the screw 15 and interconnected orifice plate 23 to move a slight amount for angular rotation of the adjustment member 17. In this manner the orifice 7 is accurately and finely located with respect to the diaphragm unit 8.

The diaphragm unit 8 is preferably constructed in accordance with the previously referred to issued patent of Weber et al. In particular, the diaphragm unit 8 includes a flat, web spring 34 and a highly flexible convoluted diaphragm 35 which are clamped completely about the peripheral edge between the housing members 9 and 12 with the central portion thereof coaxially aligned with the orifice 7. An encircling convolution 36 is formed in the diaphragm and projects into the input chamber defined by the housing 9. The diaphragm has an essentially zero spring rate as the result of the convolution. The web spring 34 is provided with a peripheral annular mounting portion 37 which is connected to a central ring portion 38 by a plurality of curved leaf spring arms 39. The inner ring portion 38 exposes the diaphragm 35 to the orifice 7 to permit movement of the diaphragm into sealing engagement with the orifice face 24. The engagement, however, of the annular ring 38 with the orifice plate 23 will support the spring member and prevent excessive deflection in the event of significant positive pressures within the input chamber 9. The diaphragm 35 is further preferably constructed with an inwardly projecting integral enlargement 40 in the central portion within the convolution 36. A diaphragm pressure stop 41 is supported by a bridging bracket 42 which spans the member 9 and is secured at the opposite ends to the member 9. The stop 41 is thus located in slightly spaced relation to the enlargement 40 and is engaged thereby in the event of an abnormal negative pressure condition in the input chamber.

The set point adjustment of sensor 2 is obtained by axially positioning of the orifice 7 with respect to the unit 8 with the diaphragm and spring in the mid-position. If the orifice 7 is positioned inwardly in closely spaced relation to the diaphragm assembly 8, a very slight pressure in the input chamber will result in a movement into effective sealing engagement over the orifice, thereby rapidly establishing an increased back pressure generally corresponding to the regulated supply pressure. Conversely, as the orifice 7 is retracted as the result of rotation of the threaded adjustment member 17, the spacing is increased and the input pressure must rise to a correspondingly increased level before effecting a closure of the orifice.

The mid-position of the spring which is established with a zero input pressure signal in the input chamber is also the position of the smallest spring rate. As the spring is deflected, the spring rate increases thereby providing for the highest sensitivity of the sensor at the low set-point adjustments and at the same time for a wide span of set-point adjustment.

Thus, typical characteristics are shown in FIG. 5 for various positive and negative pressures from a regulated supply. The output characteristic for a positive supply are shown in the first quadrant and those for a negative supply in the fourth quadrant. For practical purposes, the output signal corresponding to the maximum positive or negative signal level are in a fully "on" state equal to the supply pressure while atmospheric or reference zero pressure represents a fully "off" state.

In a practical application as specifically constructed for the vacuum powered sewage transport system, the diaphragm was formed of an EPT rubber with a 0.775 inch effective diameter. The diaphragm was supported by a pair of web springs formed of a 0.005 beryllium copper defining a total average spring rate of approximately 9.4 pounds per inch. The orifice was supported by a screw having threads of the standard 10-32 UNF and an adjustment nut member having an external thread of 5/16-30 UNS. The threaded arrangement established a leakport displacement of essentially 0.0021 inches per complete turn of the adjusting thread nut member. This is equivalent to a single screw with approximately 476 threads per inch.

The adjustable set point permitted variation between zero and 36 inches of water gauge as a result of approximately 15 turns of the adjusting nut member. The system operated with a nominal supply of fifteen inches of mercury vacuum. This sensor operated satisfactorily submerged in water and could readily withstand positive pressure overloads in the input chamber of up to 25 pounds per square inch gauge and negative pressures within the control chamber of the order of 25 inches of mercury vacuum while maintaining a set point deviation of plus and minus 5 percent.

The present invention thus provides an adjustable set point leakport type sensor which permits sensing of very low pressures while having an extremely fine set point adjustment, without the necessity of components which are difficult or expensive to manufacture. The sensor can be employed with either a positive or negative pressure source and the supply magnitude can be adjusted to suit the need of the given application.

I claim:

1. An adjustable leakport pressure sensor employing a leakport means and pressure responsive closure means having a predetermined position relative to the leakport means for opening and closing of the leakport means to establish essentially full pressure and reference pressure, comprising an input chamber means, an orifice unit, a rotatable adjustment member threadedly mounted within the input chamber portion and having a threaded opening aligned with the orifice unit, said orifice unit having a threaded support portion threaded into said threaded opening, the inner threads and outer threads of said adjustment member having slightly different pitches, and means coupled to said orifice unit permitting axial movement of the threaded support portion relative to predetermined position of the closure means and preventing rotation of the threaded support portion to establish a setpoint control of the pressure sensor.

2. The pressure sensor of claim 1 wherein the difference in said thread pitch is of the order of one thousandths of an inch.

3. The pressure sensor of claim 1 wherein the difference in said thread pitch is between one and four thousandths of an inch.

4. An adjustable pressure sensor apparatus comprising a housing member having a flexible diaphragm wall means defining a portion of a control chamber and of an input chamber, an adjustment nut threaded into said housing with an axis normal for said flexible wall means, an adjustment screw threaded into said nut and having an inner nozzle means located within said control chamber with an end orifice in opposed relation to said flexible wall means and opened and closed thereby to establish full pressure and reference pressure in the control chamber in response to slight movement of the wall means, interlock means coupling said nozzle means to said housing and preventing rotation of said screw and having means permitting axial movement of said screw, said adjustment nut including inner and outer threads of slightly different thread pitch to move the nozzle in response to rotation of the nut.

5. The pressure sensor of claim 4 wherein said flexible wall means includes a resilient diaphragm of a rubber-like material rigidly clamped about the periphery and with a flat planar sealing face aligned with the orifice, said diaphragm having an essentially zero spring rate in the diaphragm, and a flat spring clamped against said diaphragm between said orifice and said diaphragm, said spring including a center ring portion concentric of said orifice and connected to an outer ring portion by a plurality of spring arms to establish a preselected diaphragm spring rate.

6. The sensor of claim 5 having a stop wall located in the input chamber in alignment with the center of the diaphragm.

7. The pressure sensor of claim 4 wherein said flexible wall means includes a resilient diaphragm of a rubber-like material rigidly clamped about the periphery and with a flat planar sealing face aligned with the orifice, said diaphragm having a convolution projecting into the input chamber, said convolution establishing an essentially zero spring rate in the diaphragm, a flat spring clamped against said diaphragm between said orifice and said diaphragm, said spring including a center ring portion concentric of said orifice and connected to an outer ring portion by a plurality of spring arms to establish a preselected diaphragm spring rate, and a stop wall located in the input chamber in alignment with the center of the diaphragm.

8. The sensor apparatus of claim 4 having a regulated fluid supply means connected to establish flow through said orifice in accordance with the position of said wall, and a load connection means connected to said orifice to respond to the back pressure resulting from the position of the diaphragm wall means.

9. The pressure sensor of claim 4 wherein said housing includes a control member having a central threaded opening to receive said nut and a recess in one end defining said control chamber with a sidewall connecting passageway to said control chamber, an intermediate section connecting said control chamber to the threaded opening, said screw having a smooth shaft portion aligned with said intermediate section, a seal rotatably sealing the section about the shaft portion, said nozzle and interlock means including a plurality of axial notches and mating projections extending into said notches, said notches being longer than said projections to permit said axial movement of said screw.

10. The pressure sensor of claim 4 wherein said housing includes a control member having a central threaded opening to receive said nut and a recess in one end defining said control chamber with a sidewall connecting passageway to said control chamber, a reduced throat section connecting said control chamber to the threaded opening, said screw having a smooth shaft portion aligned with said throat section, an O-ring seal rotatably sealing the throat section about the shaft portion, said enlarged nozzle having a plurality of outer axial peripheral notches, and said interlock means including selected notches less than all of said notches and a ring member attached to the adjacent wall of the control chamber with interlock projections extending into said selected notches.

11. An adjustable set point pressure sensor employing a leakport means a pressure responsive closure means for variably opening and closing of the leakport means, comprising a input chamber means, an orifice unit, a housing for said orifice unit, means to mount said closure means in said input chamber to establish a relatively fixed position relative to said housing, and movable adjustment means connected to said orifice unit and movable axially of the orifice unit and repositioning of the orifice unit without rotation of said orifice unit in response to movement of the adjustment means and axially adjusting the position of the orifice unit accurately with respect to said housing to adjust the set point of the sensor.

12. The adjustable set point pressure sensor of claim 1 wherein said closure means includes a convoluted flexible diaphragm wall means having an essential zero spring rate and a flat web spring having its lowest spring rate at the unstressed mid-position of the closure means.

* * * * *

UNITED STATES PATENT OFFICE
CERTIFICATE OF CORRECTION

Patent No. 3,791,397          Dated February 12, 1974

Inventor(s) George J. Janu

It is certified that error appears in the above-identified patent and that said Letters Patent are hereby corrected as shown below:

Claim 4, line 51, cancel "for" and substitute therefor ---to---

Signed and sealed this 17th day of December 1974.

(SEAL)
Attest:

McCOY M. GIBSON JR.           C. MARSHALL DANN
Attesting Officer             Commissioner of Patents